(12) United States Patent
Kim et al.

(10) Patent No.: US 10,771,546 B2
(45) Date of Patent: Sep. 8, 2020

(54) MANAGING GROUPS OF USERS IN AN APPLICATION CLIENT

(71) Applicant: MZ IP Holdings, LLC, Palo Alto, CA (US)

(72) Inventors: Jai Kim, San Mateo, CA (US); Garth Gillespie, Palo Alto, CA (US); Ryan Jacobson, San Jose, CA (US); Ajk Palikuqi, Santa Clara, CA (US)

(73) Assignee: MZ IP Holdings, LLC, Palo Alto, CA (US)

( * ) Notice: Subject to any disclaimer, the term of this patent is extended or adjusted under 35 U.S.C. 154(b) by 0 days.

(21) Appl. No.: 16/597,616

(22) Filed: Oct. 9, 2019

(65) Prior Publication Data
US 2020/0128070 A1 Apr. 23, 2020

Related U.S. Application Data

(60) Provisional application No. 62/747,193, filed on Oct. 18, 2018.

(51) Int. Cl.
*H04L 29/08* (2006.01)
*H04L 12/26* (2006.01)
*A63F 13/31* (2014.01)

(52) U.S. Cl.
CPC .......... *H04L 67/1044* (2013.01); *A63F 13/31* (2014.09); *H04L 43/0876* (2013.01); *H04L 67/306* (2013.01)

(58) Field of Classification Search
CPC ............. H04L 67/1044; H04L 43/0876; H04L 67/306; A63F 13/31
See application file for complete search history.

(56) References Cited

U.S. PATENT DOCUMENTS

| | | | | |
|---|---|---|---|---|
| 6,311,146 B1* | 10/2001 | Hao | ...................... | G06F 30/367 703/14 |
| 8,387,110 B1* | 2/2013 | Cooper | ................. | H04L 63/102 726/1 |
| 9,363,221 B1* | 6/2016 | Ozog | .................... | H04L 67/306 |
| 9,392,355 B1 | 7/2016 | Kulavik | | |

(Continued)

OTHER PUBLICATIONS

International Search Report for International application No. PCT/US2019/055975 dated Feb. 21, 2020.

*Primary Examiner* — Arvin Eskandarnia
(74) *Attorney, Agent, or Firm* — Womble Bond Dickinson (US) LLP (57) ABSTRACT

Logically separating users into isolation groups is described. An example computer-implemented method can include identifying a first group of users of an online system that allows users to interact with one another on the online system. The method may also include grouping the first group of users into a first isolation group. The method may also include identifying a second group of users of the online system separate from the first group of users within the online system. The method may also include grouping the second group of users into a second isolation group. The first isolation group and the second isolation group may include logical boundaries that restrict interaction within the online system between users in the first isolation group and users in the second isolation group. Additionally, the first isolation group and the second isolation group may be hosted on the same server.

20 Claims, 8 Drawing Sheets

(56) References Cited

U.S. PATENT DOCUMENTS

| | | | |
|---|---|---|---|
| 2013/0311361 A1* | 11/2013 | Boss | G06Q 40/12 |
| | | | 705/39 |
| 2016/0323191 A1* | 11/2016 | Aoki | G06Q 30/04 |
| 2017/0337201 A1* | 11/2017 | Pak | G06F 16/24578 |
| 2017/0340963 A1 | 11/2017 | Bucher et al. | |
| 2019/0130580 A1* | 5/2019 | Chen | G06T 7/20 |

* cited by examiner

MANAGING GROUPS OF USERS IN AN APPLICATION CLIENT

CROSS-REFERENCE TO RELATED APPLICATIONS

This application claims the benefit of U.S. Provisional Patent Application No. 62/747,193, filed Oct. 18, 2018, the entire contents of which are incorporated by reference herein.

BACKGROUND

The present disclosure relates generally to managing users in an application client. Online systems may allow users to interact with each other. Members of the online systems may use the applications offered by the online systems for many years or even decades. Some online systems separate their users into different groups based on server location. Thus, users located in the United States may be hosted on a server in the United States, and users located in Asia may be hosted on a server in Asia. Generally, users hosted on one server cannot interact with users hosted by a different server. This type of separation may be referred to as sharding. Sharding is a type of partitioning of data that separates large data sets into smaller and more easily manageable parts called shards. Shards may also be referred to as "zones," "realms," or "servers" (because often a single server supports a single shard). In many online systems, including online multiplayer games, online shopping platforms, and social media networks, users are sharded into different zones. Often, each zone is created as a separate instance of the application and is hosted by a separate server. Consequently, users in separate zones generally cannot interact with one another.

DETAILED DESCRIPTION

The subject matter of this disclosure generally relates to separating users of an online system into isolation groups while still on the same server. In online systems where users interact with one another, users may be separated into different groups. Such groups may be referred to as realms, or zones. For a variety of reasons including processing bandwidth and user management, many online systems separate each group onto its own server. In these systems, different groups are physically separated from each other onto different servers. This restricts interaction between different groups or otherwise makes communication cumbersome between users in different groups because of technical limitations of the servers. Users may become frustrated when they cannot communicate with users in another group. Traditionally, to allow users in different groups to communicate with one another, the online system would need to move user data from one server to another server, which is time-consuming and expensive. Thus, to allow free interaction between all players, it may be advantageous to host all players on the same server.

However, an online system may not wish to allow users to freely interact with one another. For business or technical reasons, it may be desirable to separate users into distinct groups and isolate those groups from one another. The most desirable option would be for an online system to have the freedom to both separate users if desired and to allow users to interact with one another without needing to move user data to different servers to facilitate user interaction. For example, a massively multiplayer online (MMO) game may be an online video game which can be played simultaneously by a large number of users. Users may be separated into different groups for multiple reasons. One reason may be to prevent overcrowding. A game may have 50 million users and a finite world map. If all 50 million users played on the same world map, the game would be too crowded. The online gaming system that manages the MMO may separate users into different groups to reduce the population with which each player interacts. Groups may be limited to, for example, 100 or 1,000 players. Each group may be using its own instance of the game, so that the virtual world layout is the same for all the groups, but each group uses its own isolated version of the virtual world. Further, each group may be hosted by a different server. This may help the game run more smoothly due to load balancing which may decrease latency during game play. However, separating groups out into different servers may be disadvantageous for the reasons discussed above.

Another problem that online systems may face when onboarding new users may be information overload of new users. An online system may periodically add features to its user interface over the months and years that it offers an application (e.g., social network, game, online shopping platform, etc.). Users who have been with the online system and using the application since the beginning may be accustomed to and ready for each new feature that is added. However, if a new user joins after an application has been operating for several years, all the features and options presented may overwhelm the new user. This may cause the new user to disengage with the application. For example, a user of an online shopping platform may initially join after the online shopping platform has been operating for years. The user may be bombarded with options, offers, deals, and recommendations to buy new products. This may overwhelm the user and cause the user to close out of the application, whereas an experienced user may not be bothered by all the features and options at all. Thus, it may be desirable to present users with different user interfaces based on how long they have been using the application. A new user may be shown a relatively simple user interface. Features may be presented gradually, giving the user time to grow accustomed to each new feature before introducing new features. As the new user becomes more experienced with the application and develops into a mature user, it may be desirable to allow the now mature user to communicate with other mature users. If, however, the user is separated off with other new users on a separate server from the other users, it may be difficult to allow the user to communicate with other mature users once the new user matures. There may be other reasons to separate users into different groups, which will be discussed herein.

Separating users into different groups, referred to herein as isolation groups, may have one or more of the following benefits. (1) Separation of in-game economy. Users in one isolation group may mature at a different pace than users in another isolation group. The online system may more effectively optimize user interaction by customizing features and UI components for each isolation group. (2) Isolation of game management experiments or content. The online system may run, for example, A/B tests on different isolation groups. By restricting interaction between isolation groups, the online system may better understand the effectiveness of the A/B testing. (3) Managing isolation group membership. Users in a particular region may enjoy a better user experience if playing with a particular set of other users. The online system may be able to control which users belong to which isolation group based on a variety of factors, including, for example, geographic location, culture, spending preferences, or other suitable characteristics.

Further, a new isolation group may be instantiated with existing resources already present in the application client, without the need to stand up additional servers to handle the independent data set and user base that is created with each new isolation group. Thus, in contrast to traditional methods of sharding users onto different servers, the present disclosure contemplates separating users on a software level using logical separation (e.g., software code) rather than with physical boundaries (e.g., separate servers). Separating users this way include one or more of the following benefits. (1) No need for separate infrastructure to create new isolation groups. Consequently, infrastructure requirements may be dictated by actual load instead of requiring separate hardware for each new isolation group. (2) Less infrastructure may lead to less maintenance of that infrastructure. (3) Increased flexibility in defining which users belong to which isolation groups. (4) Improved control over the definition of the isolation boundary between isolation groups, as there may be certain interactions that are desired even across isolation group boundaries. Although this disclosure uses the word "users" interacting with an application client, this disclosure contemplates any suitable entity as being able to interact with an application client, including businesses, organizations, and "bots" (e.g., an autonomous program on a network that can interact with computer systems or users, for example, one designed to respond or behave like a player in an adventure game). Thus, the term "user" encompasses human users, bots, businesses, organizations, and any other entity that interacts with the application client or other users on the online system.

Figure 1:
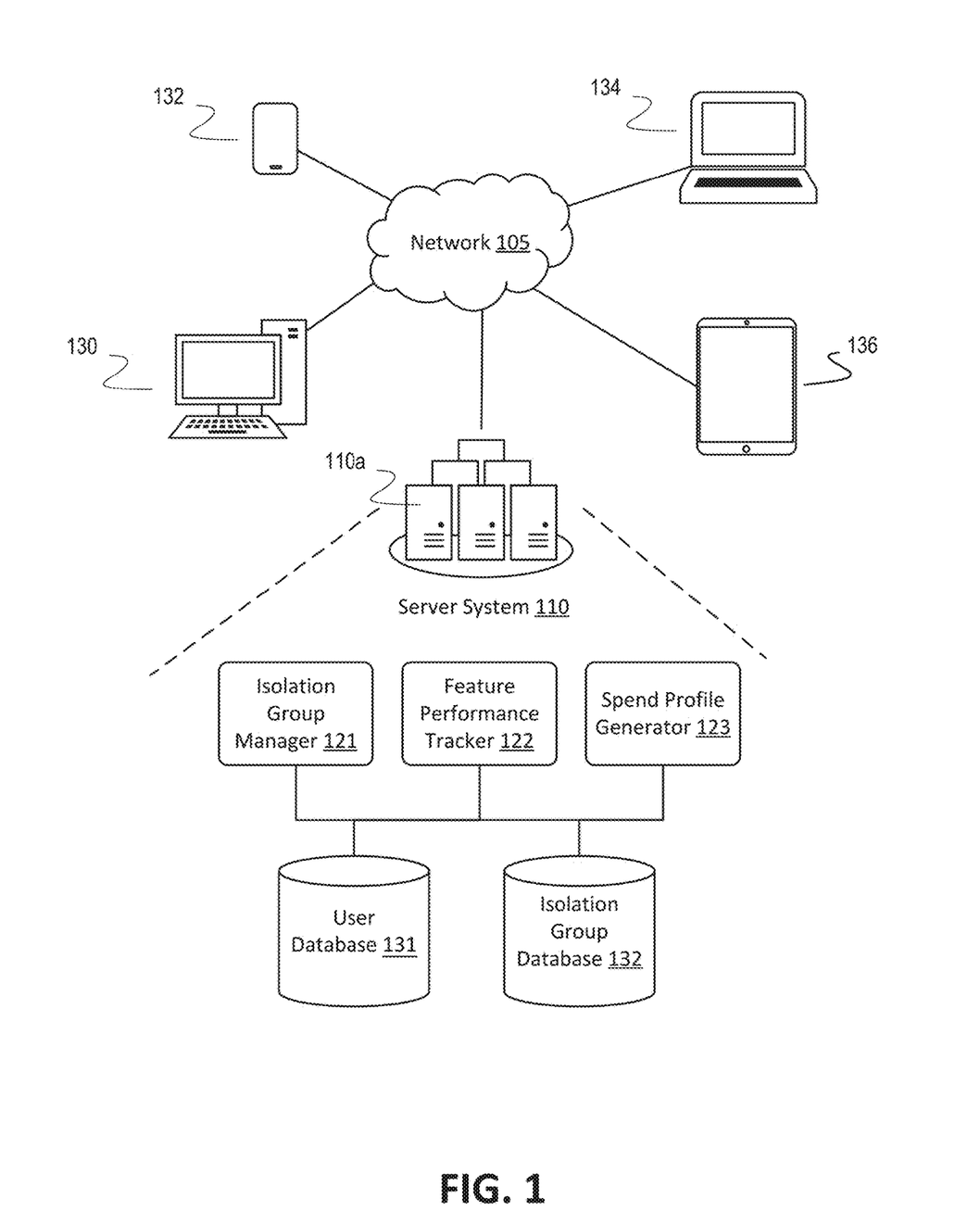
FIG. 1 is a schematic diagram of an example user management system for managing groups of users in an application client.

FIG. 1 is a schematic diagram of an example user management system 100 for managing groups of users in an application client. A server system 110 including one or more servers 110a provides functionality for operating and managing an online application used by users via client devices 130-136, including installs of an online application (e.g. mobile application, gaming application, mobile gaming application), facilitating user interactions, introducing features, and any other suitable operation. The server system 110 includes software components and databases that can be deployed at one or more data centers in one or more geographic locations. In certain instances, the server system 110 is, includes, or utilizes a content delivery network (CDN). The server system 110 may include one or more software components, including an isolation group manager 121, a feature performance tracker 122, a spend profile generator 123, and any other suitable component for fulfilling the methods discussed herein. The software components can include subcomponents that can execute on the same or on different individual data processing apparatus. The server system 110 databases can include a user database 131 and an isolation group database 132, and any suitable number of other databases that are not illustrated in FIG. 1, such as a features database, a payments database, or an authentication database. The databases can reside in one or more physical storage systems. The software components and data will be further described below.

An application, such as a web-based application, can be provided as an end-user application to allow users to interact with the server system 110 and with other users of the server system 110 via the application. The client application or components thereof can be accessed through a network 105 (e.g., the Internet) by users of client devices, such as a personal computer 130, a smart phone 132, a laptop computer 134, or a tablet computer 136. Other client devices are possible. Additionally, or alternatively, software components for the system 100 (e.g., the isolation group manager 121, the feature performance tracker 122, the spend profile generator 123) or any portions thereof can reside on or be used to perform operations on one or more client devices.

The user management system 100 includes the isolation group manager 121, the feature performance tracker 122, and the spend profile generator 123 as being able to communicate with the user database 131 and the isolation group database 132. The user database 131 may include information about users that the users have provided to the user management system 100, such as user names, profile information, which isolation group the user is in, activity that the user has engaged in on the application, other users that the user engages with, content that the user has viewed or interacted with, and any other suitable information. The isolation group database 132 may include information about one or more isolation groups instantiated by the user management system 100. Such information may include the number of users in each isolation group, the age of each isolation group, the engagement activity of users as a whole or individually within each isolation group, the portion of a virtual world that the isolation group occupies, and any other suitable information.

The isolation group manager 121 may be responsible for creating (e.g., instantiating) new isolation groups as well as managing existing isolation groups. The isolation group manager 121 may be implemented by one or more human operators, or may be implemented as a machine-learning model that automatically performs one or more of the actions discussed herein. An isolation group may apply to a given group of users and may be one method of categorizing user data. For example, in an MIO game, players may be separated into different kingdoms. Each kingdom may represent an isolation group. In the game, players may be restricted to the kingdom in which they are assigned. They may be unable to move into other kingdoms or to communicate with players in other kingdoms. This will be discussed in more detail with reference to FIG. 3 below. The code snippet below provides examples of definitions of a model for the user, kingdom, and the isolation group. In this example, the definition of an isolation group is done at the province level (e.g., a sub-group within a kingdom). If a new isolation group is to be created, a new entry may be added to an "IsolationGroup" table, and all kingdom rows may point to the corresponding group_id.

```
class User extends DbModel {
    public $user_id        = [Type::uint, PRIMARYKEY];
    public $kingdom_id     = [Type::uint];
}
class Kingdom_extends DbMode1 {
    public $kingdom_id     = [Type::uint, PRIMARYKEY];
    public $group_id       = [Type::uint];
}
class IsolationGroup extends DbMode1 {
    public $group_id       = [Type::uint, PRIMARYKEY];
}
```

When a user in an isolation group wishes to interact with another player, the isolation group manager 121 may determine whether the two entities are eligible to interact with each other. The determination may be made by first checking whether the entities are located within the same isolation group. If they are within the same isolation group, the interaction may be allowed. However, if they are not within the same isolation group, the interaction may be disallowed. Exceptions to this may exist and are discussed with reference to FIG. 7 below. The determination may be performed at the level where model objects are constructed from the database table by only considering the model object as "active" if the object is associated with the current context's isolation group as well. In other words, if two entities do not belong to the same isolation group, they may be considered "inactive" relative to each other.

Figure 3:
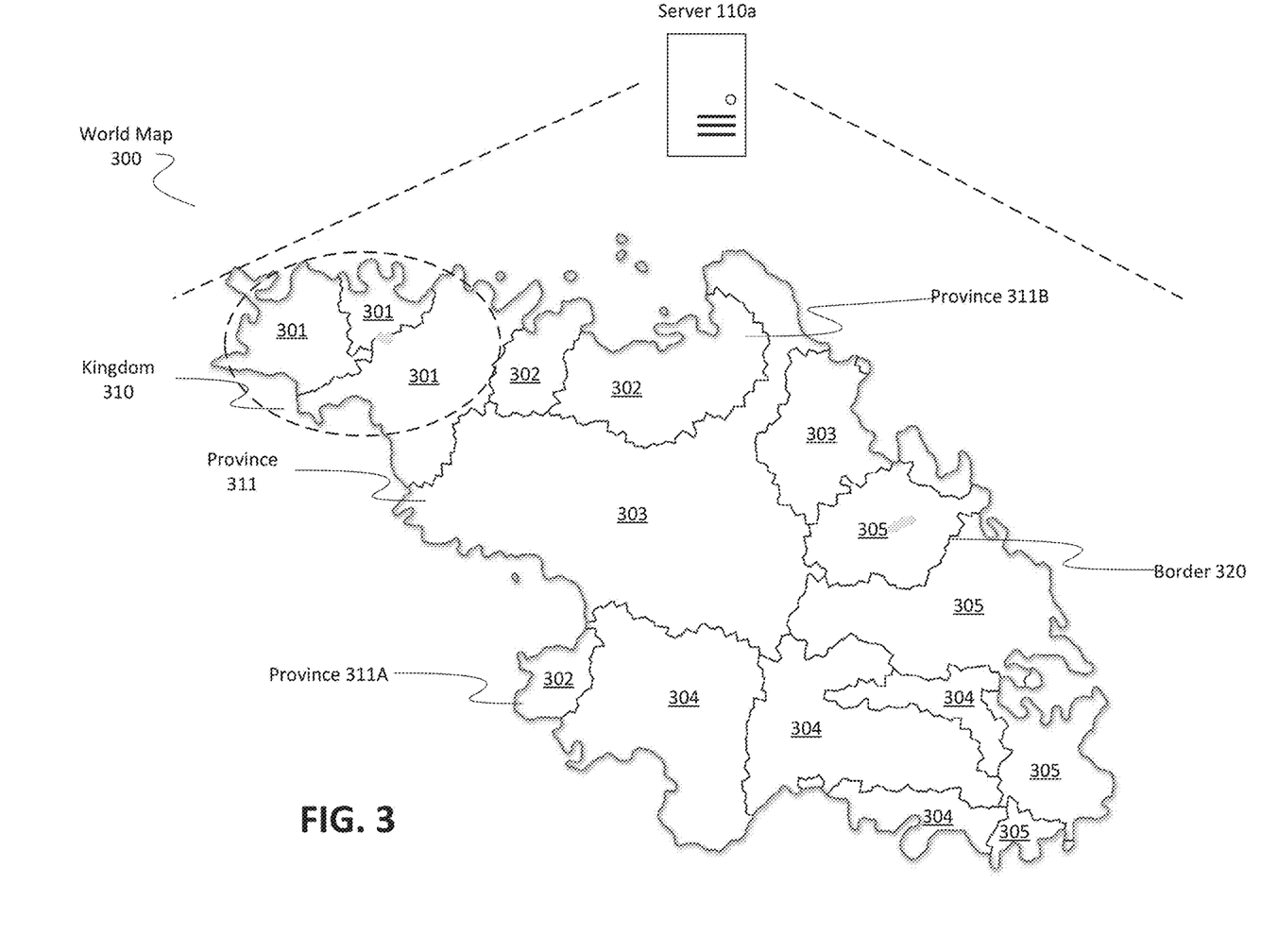
FIG. 3 is an example virtual world map that includes example logical boundaries between example isolation groups.

The isolation group manager 121 may facilitate the creation of new isolation groups by enabling new logical boundaries to be generated around a particular group of users. These logical boundaries may be implemented at the software level using software instructions. The characteristics of these boundaries may include preventing cross-group interaction (e.g., communication, economic activity, viewing the activity of users outside the isolation group), and preventing users from visiting areas of the application outside of the logical boundaries. In an example MMO game, these logical boundaries may manifest as country or kingdom borders, as illustrated in FIG. 3. In an example online social network, the logical boundaries may manifest as a private group where users may interact with one another within the group but not with users in different groups. The users in one isolation group may not even see that other groups exist on the social network. In an example online retail platform such as an online marketplace, the logical boundaries may manifest as an independent walled-off marketplace, where users may buy, sell, and trade with other users within the marketplace but not with users in other marketplaces. The users in one isolation "marketplace" may not even see that other marketplaces exist, or may not be able to view any of the products offered for sale within the other marketplaces. There may be any number of reasons for isolating users in this manner, including improving user experience with the application (e.g., social network, game, shopping platform, etc.), increase engagement with the application, reducing the management overhead of highly-populated online arenas, beta testing new features, protecting certain users from other users (e.g., preventing adult users of an online social network from messaging minors) or any other suitable reason.

The isolation group manager 121 may group users in any suitable arrangement. For example, users may be grouped based on the date that the application was installed on their client device 130-136 or otherwise joined the online system. This may group the users into different "classes" or "tracks" based on when they joined the online system. For example, users who joined in January of this year may be grouped into Isolation Group A, users who joined in February may be grouped into Isolation Group B, and so on. Each isolation group may be subject to the logical boundary rules discussed herein. Another arrangement for grouping users into isolation groups may be the users' geographic location. For example, all users whose IP address is located in California are in one isolation group, users whose IP address is located in New York are in another isolation group, and so on.

Another example of a way to arrange isolation groups is by spending profiles for the users. Each user may be associated with a spending profile generated by spending profile generator 123. An application client may allow users to purchase items of content (e.g., virtual items in an MMO, actual items via an online shopping platform, etc.). Users who purchase items of content in the application client can be referred to as "spenders." According to an exemplary embodiment, isolation groups can allow an appropriate and preferred distribution of spenders to be maintained in each isolation group. Such a distribution can be represented as, for example, a bell curve, which can include a certain number of under-spenders (e.g., the far left of the bell curve), a majority of "average" spenders (e.g., the middle of the bell curve), and a certain number of over-spenders (e.g., the far right of the bell curve). The isolation groups may be managed to maintain the preferred spending distributions in each isolation group. For example, isolation groups can be merged and separated to, for example, maintain a preferred distribution of spenders within each isolation group. The preferred distribution of spenders in each isolation group may serve to improve the user experience with the application. The right mix of under-, average-, and over-spenders may give all of the users in each isolation group the perception that they can continue to progress within the application. For example, in an MMO, by continuing to purchase additional items, the users may be able to progress within the game. Users who are too far to the left of the bell curve may be too far behind to get ahead, and may not purchase more items (e.g., because they do not believe they can continue to make progress in the game). Users who are too far to the right of the bell curve may be so "powerful" that they could dissuade other users from trying to keep up by purchasing additional items.

Other arrangements of isolation groups may be random assignment, user selection, or based on a user engagement level. User selection may simply allow users to select which group they want to join. In an MMO game, the users may select the kingdom or realm they want to join for any reason. In an online shopping environment, the users may select the marketplace they wish to join. For example, they may want to join a trade marketplace, where goods and services are exchanged for other goods and services instead of money. Alternatively, a car enthusiast may join a car parts marketplace to buy and sell rare or vintage car parts. If the grouping is based on engagement level, users may be separated into groups to satisfy a bell-curve distribution of engagement, similar to the spending profile arrangement, or users may be grouped with users having similar engagement.

Figure 2:
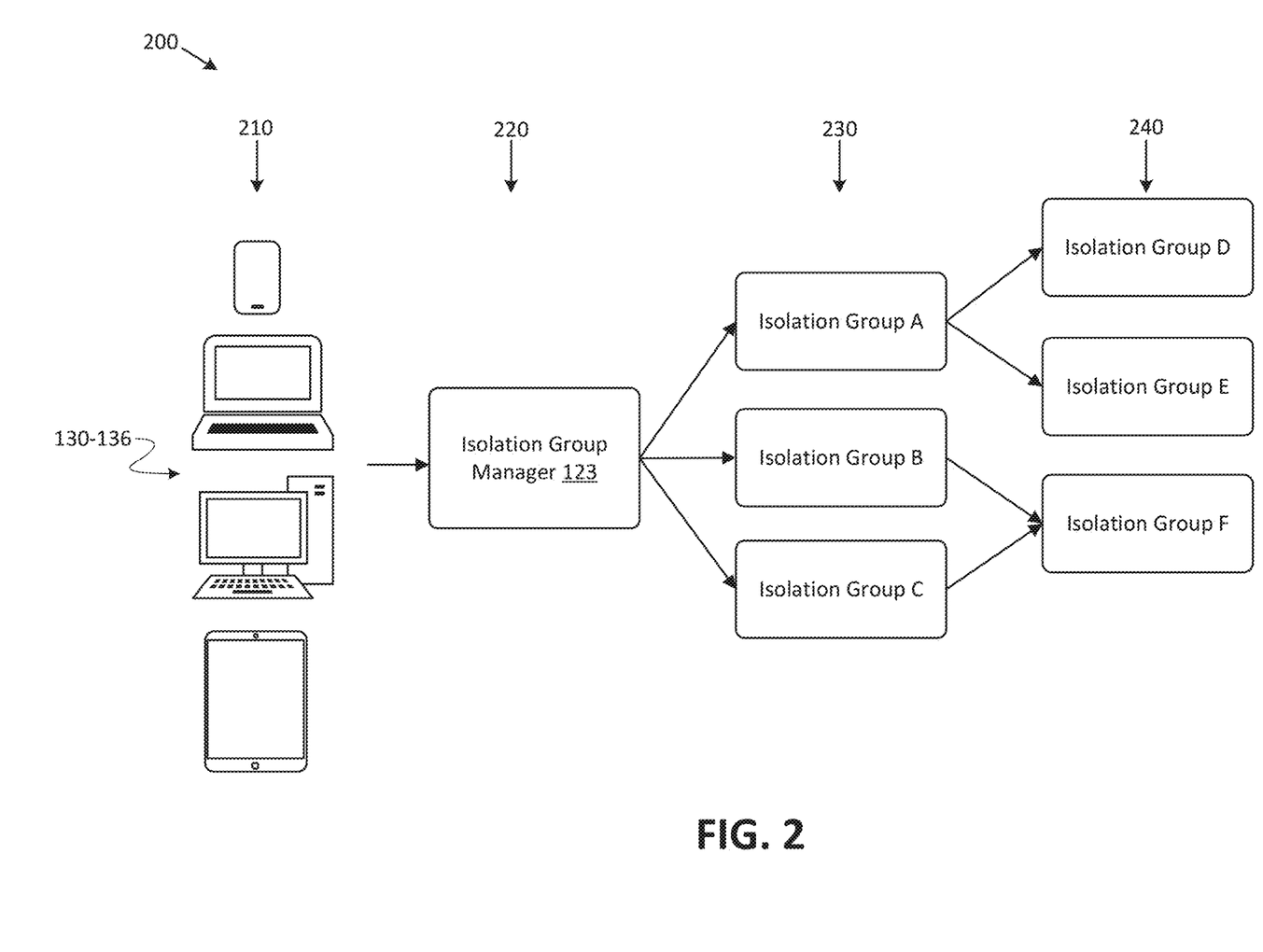
FIG. 2 is a schematic flow diagram of an example user management system grouping users into separate isolation groups.

FIG. 2 is a schematic flow diagram 200 of the user management system 100 grouping users into separate isolation groups. At step 210, users may join the application client by registering or installing the application on a client device 130-136. At step 220, the users may be analyzed and processed by isolation group manager 121, which may categorize the users into one or more isolation groups at step 230 based on one or more of the factors discussed above. In the example of FIG. 2, the users are grouped into three isolation groups at step 230: Isolation Group A, Isolation Group B, and Isolation Group C. In some embodiments, the isolation group manager 121 may merge or split isolation groups using software instructions. For example, at step 240, Isolation group A is split into Isolation Groups D and E and isolation groups B and C are merged into isolation group F. A decision to split an isolation group into one or more new isolation groups may be based on a variety of factors, including population (e.g., one isolation group has become too populated and is split to prevent overcrowding), user engagement (e.g., if engagement is low, splitting the group may help to increase engagement), or any other suitable reason. A decision to merge multiple isolation groups into one isolation group may be made for a variety of reasons similar to those used to split (e.g., improving user experience by increasing population, increase user engagement).

In some embodiments, the isolation group manager 121 or other processing device may exhibit granular control over an individual user in a given isolation group. For example, policies specific to a particular user may be modified to encourage engagement with the application. Engagement may be measured in terms of spend (e.g., how much money does the user spend within the application), time spent within the application, the number of interactions a user has with other entities, advertising revenue, or any other suitable metric. An example policy that may be modified to improve engagement may be to offer tailored products for sale to the user (e.g., recommended products on a shopping platform, "power" items in an MMO game). Another example policy that may be modified to improve engagement may be to alter or remove one or more isolation group boundaries for the user. For example, in an MMO game, if a user is lagging too far behind other users in the isolation group (e.g., kingdom, province, realm), the user may be moved to another isolation group with a distribution of users that is a better "fit" for that lagging user. Conversely, if a user is too powerful, that user may be moved to a different isolation group with a distribution of users that are all, on average, more powerful. This way, both the lagging user and the powerful user may be closer to the average in their new isolation groups than they were in their old isolation groups. In an MMO environment, an isolation group may be a "good fit" if the user is near the average in terms of movement, spend, and player strength. In a social networking environment, an isolation group may be a good fit for a user if there is activity within the isolation group and a relatively even distribution of posters, sharers, and commenters in the isolation group. That is, users should be posting frequently and commenting on each other's posts. Moving users in the manner discussed above may help to maintain preferred spending distributions and engagement levels in each isolation group.

In some embodiments, the isolation group manager 121 or other suitable processing device may analyze the user data in user database 131 to predict a user's future engagement or spending level. For example, an analysis can be made of each user's "spend velocity" and "movement velocity" in the game. In other words, the isolation group manager 121 can evaluate the rate at which a given user makes purchases in the application, engages with other users, or moves through an MMO game. This information may be used to create a probabilistic trajectory along one or more dimensions (e.g., spend, engagement, movement, etc.), which can be used to predict future activity (e.g., in terms of spend, engagement, movement, etc.) within the isolation group.

In some embodiments, the isolation group manager 121 may temporarily merge two or more isolation groups. This may serve one or more technical or business purposes related to the application and online system. The isolation group manager 121 or other suitable processing device may temporarily merge isolation groups by removing the logical boundaries between a first isolation group and a second isolation group for a predetermined period of time (e.g., one hour, two days, one week, etc.). During this time, the users in the two groups may interact freely with each other. In some embodiments, some interactions may be permitted but others may be prohibited. For example, communication may be permitted, but economic activity may not be permitted. As another example, communication may be permitted, but users in separate groups may not be allowed to exchange contact information or add one another to friend lists. At the end of the predetermined period of time, the isolation group manager 121 may restore the logical boundaries between the first isolation group and the second isolation group such that interaction between users in the different groups is restricted. Although this discussion only mentions two isolation groups, the same applies to three or more isolation groups. The isolation group manager 121 may need to keep track of which users belong in which isolation group. This may be accomplished by applying a group tag to each user, but allowing the user to move freely within the virtual space provided when the logical boundaries were removed.

FIG. 3 is an example virtual world map 300 that includes example logical boundaries between example isolation groups in an MMO game environment. World map 300 may be hosted on a single server 110a. For the purposes of this discussion, this disclosure focuses on world map 300 as being in the context of an MMO game, but the embodiments discussed herein are not limited to video games. World map 300 comprises multiple "provinces" 311 grouped into "kingdoms" 310. Each province is separated by borders 320. In this example, each kingdom 310 corresponds to an isolation group. In this example there are five isolation groups: Isolation Groups 301, 302, 303, 304, and 305. The borders 320 separating isolation groups may correspond to the logical boundaries of the isolation groups discussed herein. Players within a kingdom may move freely between provinces within that kingdom but may not move from one kingdom to another kingdom unless authorized by the isolation group manager 121, according to the embodiments discussed herein. In embodiments, provinces need not be contiguous to be part of the same kingdom. For example, province 311A does not share a border with the other provinces associated with isolation group 302. However, in actual game play, players may not notice this. That is, players may cross the southern border of Province 311B and immediately appear in Province 311A. Importantly, all players in the entire MMO may be playing on a single instance of world map 300. Two different isolation groups may not share the same province unless they are temporarily or permanently merged. World map 300 may be only one example of how the isolation group manager 121 may organize isolation groups. Other examples include separation of users into different marketplaces, forums, tracks, or any other suitable arrangement.

Figure 4:
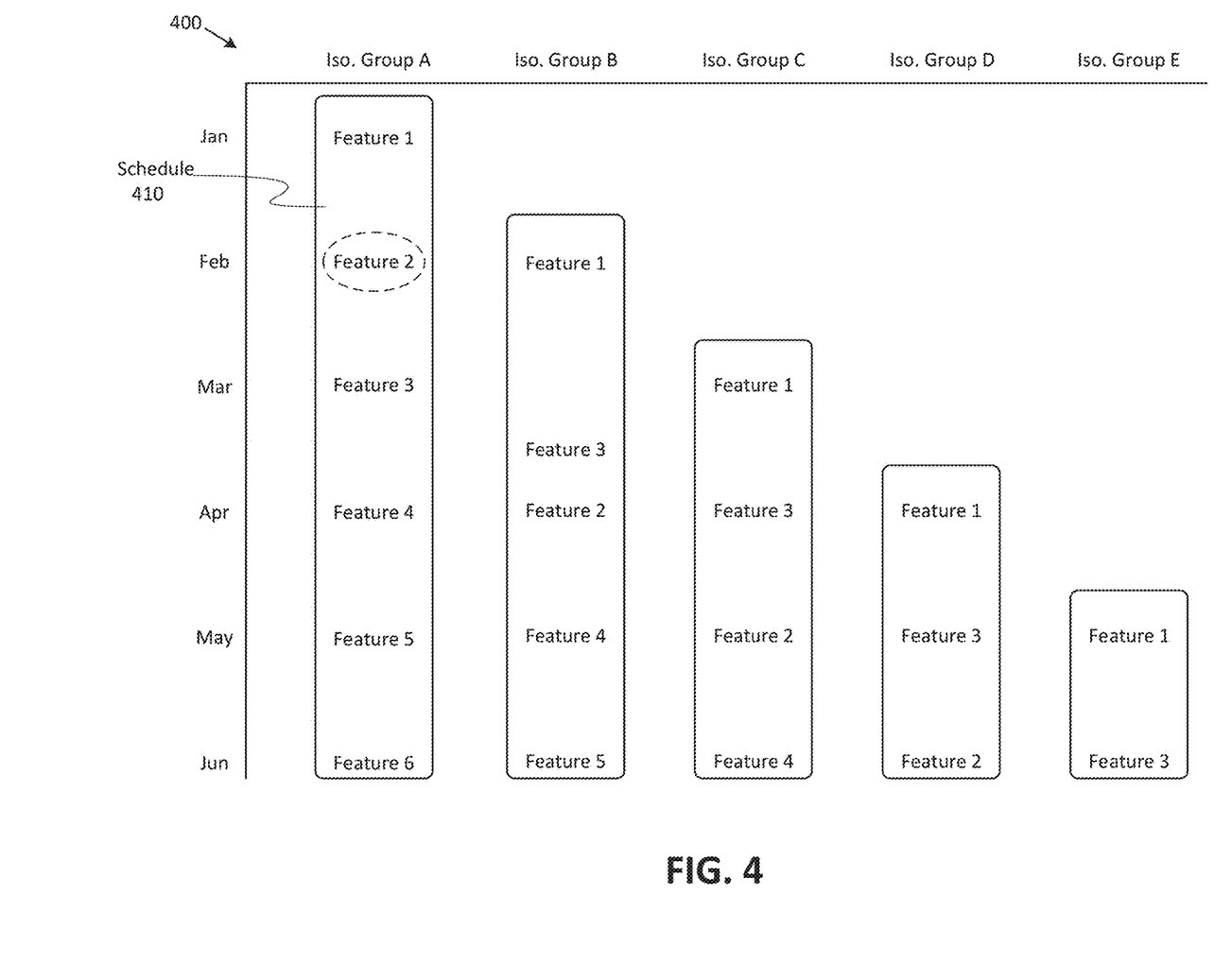
FIG. 4 is an example representation of feature introductions into different example isolation groups.

FIG. 4 is an example representation of feature introductions into different example isolation groups. There may be any number of isolation groups in the application. In this example, Isolation Groups A-E may be subject to one or more features that are scheduled to be introduced at various points along the lifetime of the isolation groups. In this example, users may be separated into different isolation groups based on when they joined the application (e.g., by installing the application or registering with the online system). Thus, Isolation Group A may have joined in January, Isolation Group B may have joined in February, Isolation Group C may have joined in March, Isolation Group D may have joined in April, and Isolation Group E may have joined in May. Each isolation group may originally be scheduled to receive a feature to be introduced once a month. Note that "feature" and "application feature" are used synonymously in this disclosure. Thus, during the first month of the isolation group's existence, Feature 1 may be scheduled to be introduced, Feature 2 during the second month, Feature 3 during the third month, and so on. Since Isolation Group A is the oldest isolation group, it acts as the "guinea pig" of the isolation groups. Isolation Group A may be the first isolation group to receive the new features. The introduced features may be any suitable feature, such as a video chat feature in an online social networking system, a new weapon in an MMO game, a new streamlined purchase user flow in an online shopping platform, or any other suitable feature. In the example of FIG. 4, similar to a class curriculum for a cohort of students in a school, each isolation group may be introduced at a set point in the lifetime of the isolation group.

In some embodiments, the feature performance tracker 122 may monitor the performance of each feature as it is introduced into each Isolation Group A-E. Performance may be defined in terms of revenue generated (e.g., purchases of a weapon in an MIO game, an increase in sales after the introduction of a streamlined purchasing flow, etc.), engagement with the feature (e.g., how many users have used a newly introduced video chat feature, etc.), engagement with other pieces of the application, or any other suitable metric to track a feature's performance. If the feature is performing successfully, it may be introduced to later isolation groups (e.g., Isolation Groups B-E) at a set point in the lifetime of each isolation group. If the feature underperforms, its introduction may be delayed or canceled in later isolation groups. Whether a feature performs successfully or not may be determined by the feature performance tracker 122 or any other suitable software or processing device via any suitable analysis. For example, if revenue attributable to the introduced feature is above a threshold value, the feature may be deemed successful. As another example, if user engagement with the feature is above a threshold value, the feature may be deemed successful. As yet another example, if daily active users decreases by a threshold amount or at all, the feature may be deemed unsuccessful.

Turning to the example of FIG. 4, Feature 2 may be introduced to Isolation Group A in February. Feature 2 may underperform for that isolation group. For example, user engagement with the application may decrease after Feature 2 is introduced. The feature performance tracker 122 may monitor this and detect that user engagement has decreased. The feature performance tracker 122 may alert the isolation group manager 121 of the underperformance of the feature. As a result, the isolation group manager 121 may delay introducing Feature 2 to Isolation Group B until after Feature 3 has been introduced. Once Feature 2 has been introduced to Isolation Group B, the feature performance tracker 122 may monitor Feature 2's performance with respect to Isolation Group B. In this example, Feature 2 performed well for Isolation Group B. Thus the isolation group manager 121 may conclude that Feature 3 needs to be introduced before Feature 2 in future isolation groups. Thus, for Isolation Groups C, D, and E, Feature 3 is introduced during month 2 and Feature 2 is introduced during month 3. This is merely an example of how different features may be introduced to different isolation groups. Any combination of feature introductions, cancellations, rearrangement and the like may occur.

Figure 5:
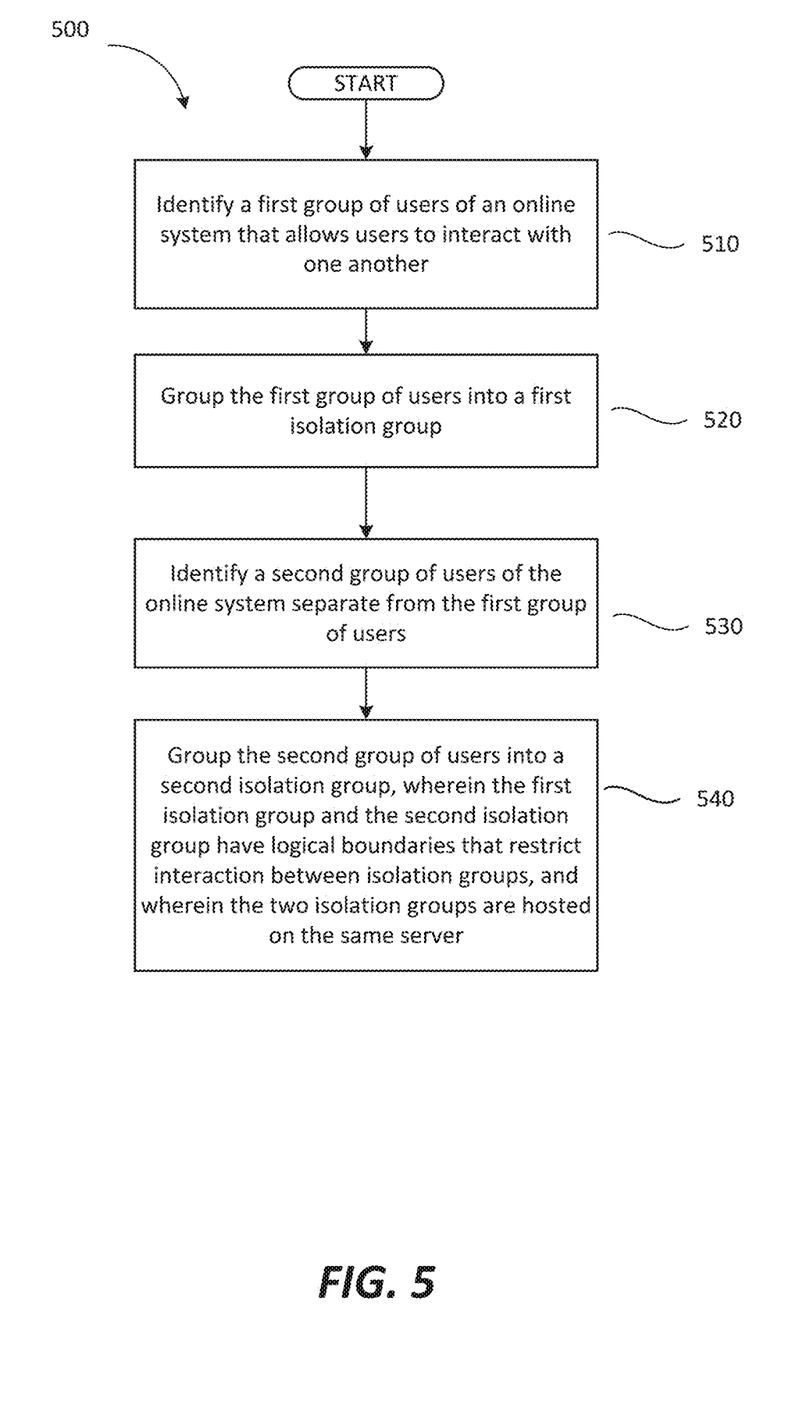
FIG. 5 is a block diagram illustrating an example method for managing groups of users in an application client.

FIG. 5 is a block diagram illustrating an example method 500 for managing groups of users in an application client. In general, the method 500 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. For example, the processing logic may be implemented as isolation group manager 121. Method 500 may begin at step 510, where the processing logic identifies a first group of users of an online system. The online system may allow users to interact with one another. As discussed above, the online system may be an application client such as a MMO game, online social network, online shopping platform or marketplace, or any other suitable application. Users may interact via group messaging, direct messaging, video or audio calls, buying and selling products, or via game avatars that interact with one another. At step 520, the processing logic may group the first group of users into a first isolation group. The first isolation group may possess one or more of the characteristics discussed herein. At step 530, the processing logic may identify a second group of users of the online system that is separate from the first group of users. As an example, the first group of users may be a cohort of users that installed an application or otherwise joined the online system during January. The second group of users may be users who installed an application or otherwise joined the online system during February. Other ways to identify the groups of users may exist according to the embodiments discussed herein. At step 540, the processing logic may group the second group of users into a second isolation group. The first isolation group and the second isolation group may have logical boundaries that restrict interaction between isolation groups. Further, both isolation groups may be hosted on the same server.

Figure 6:
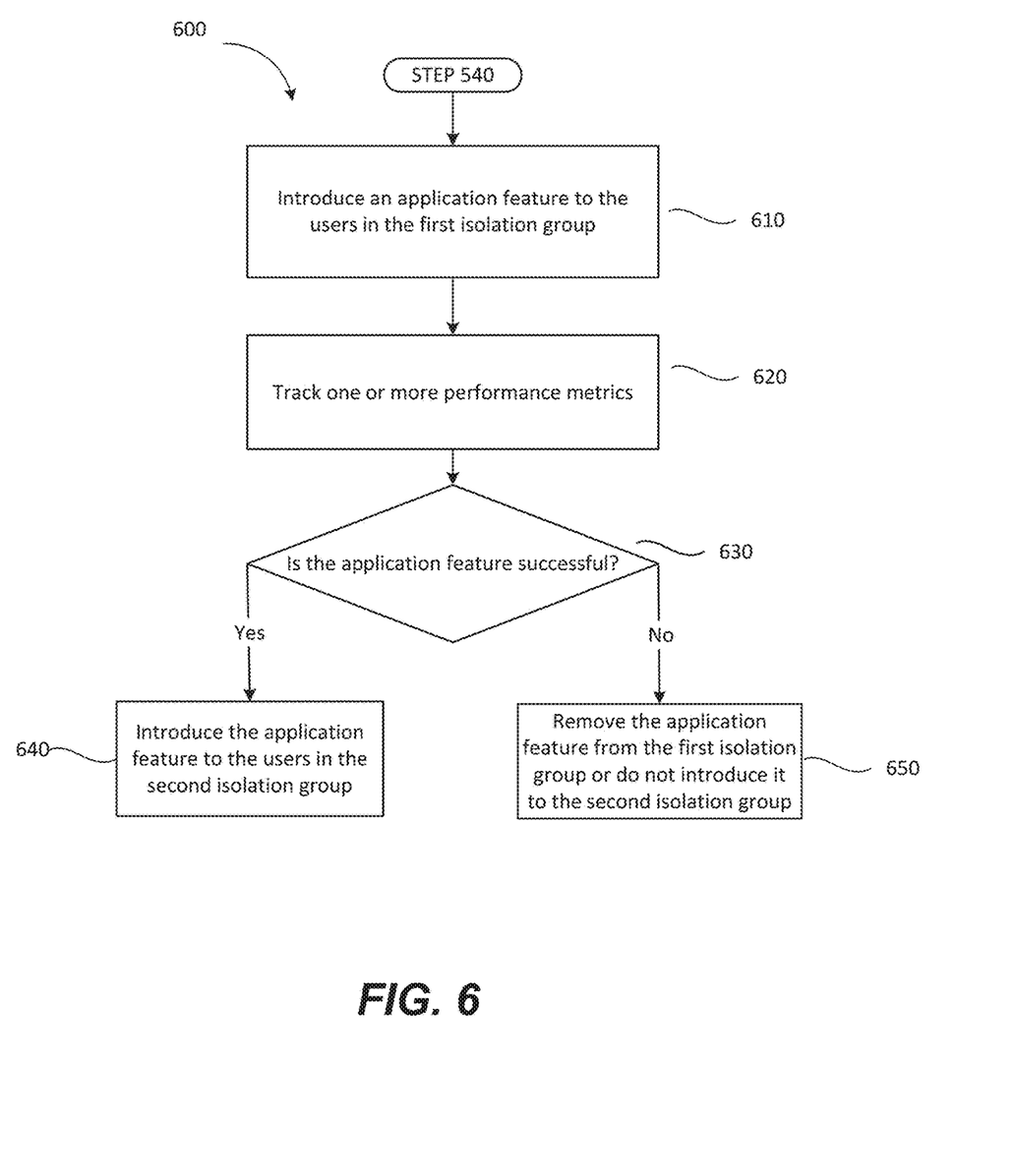
FIG. 6 is a block diagram illustrating an example method for managing groups of users in an application client.

FIG. 6 is a block diagram illustrating an example method 600 for managing groups of users in an application client. The method 600 may be an extension of the method 500. That is, step 610 may occur after step 540. At step 610, the processing logic may introduce an application feature to the users in the first isolation group. The application feature may be any suitable application feature, such as the application features discussed above. At step 620, the processing logic (e.g., the feature performance tracker 122) may track one or more performance metrics that indicate how well or poorly the application feature is performing in the isolation group, according to embodiments discussed herein. At step 630, the processing logic may determine whether the application feature was successful according to the embodiments discussed herein. If the application feature was successful, the method may proceed to step 640, where the processing logic may introduce the application feature to the users in the second isolation group. If the application feature was not successful, the method may proceed to step 650, where the processing logic may remove the application feature from the first isolation group or refrain from introducing it to the second isolation group. Alternatively, the processing logic may delay the application feature's introduction to the second isolation group, as discussed herein.

Figure 7:
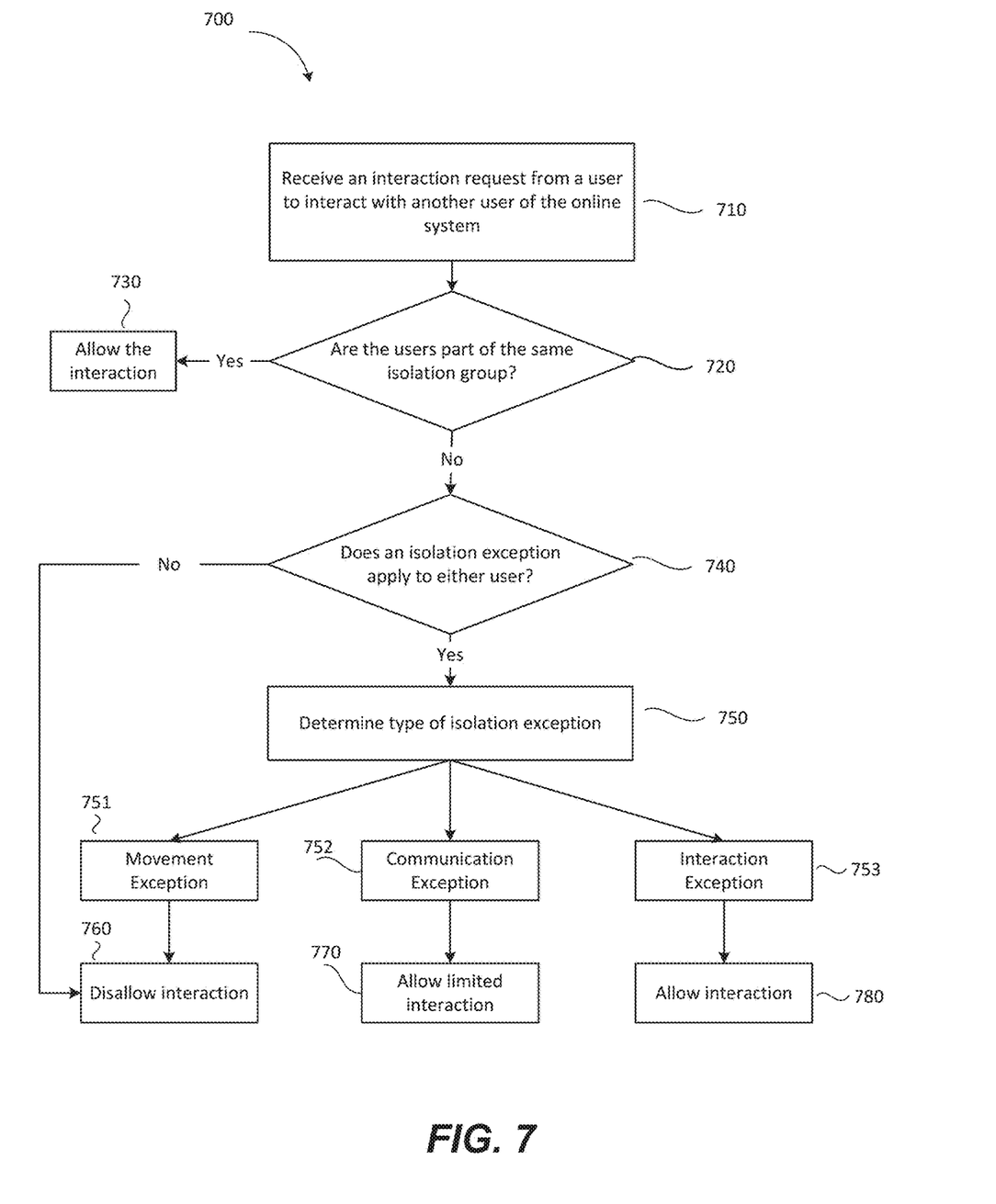
FIG. 7 is a block diagram illustrating an example method for checking whether interaction between two users is permitted.

FIG. 7 is a block diagram illustrating an example method 700 for checking whether interaction between two users is permitted. In general, the method 700 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. For example, the processing logic may be implemented as isolation group manager 121. The method may begin at step 710, where the processing logic receives an interaction request from a user to interact with another user of the online system. This may occur, for example, when a first user attempts to send another user a message. Interaction may take any suitable form, such as text communication, audio or video communication, game play, financial transactions, and so on.

At step 720, the processing logic may determine whether the users are part of the same isolation group. If yes, the processing logic may proceed to step 730 and allow the interaction. If no, the method may proceed to step 740 and determine whether an isolation exception applies to either user. An isolation exception may specify that a user may "break" one or more of the isolation group rules. For example, a user may be permitted to visit other isolation groups (e.g., different kingdoms in an MMO, different marketplaces on an online shopping platform, etc.), or a user may be permitted to communicate with all or a select group of other users, or a user may be permitted to have full interaction with other users or a select group of other users. If no isolation exception applies to either user, the method may proceed to step 760 and the processing logic may disallow the interaction. If, yes, the method may proceed to step 750, where the processing logic may determine the type of isolation exception. If the isolation exception is a movement exception 751, the method may proceed to step 760 and the processing logic may disallow the interaction because although the user is allowed to move, the user may not be allowed to communicate or otherwise interact with the other user. If the exception is a communication exception 752, the method may proceed to step 770 and the processing logic may allow limited interaction between the users. For example, the users may communicate but may not perform financial transactions or add one another to a contact list. If the exception is an interaction exception, the method may proceed to step 780 and the processing logic may allow the interaction. Other isolation exceptions are possible.

Figure 8:
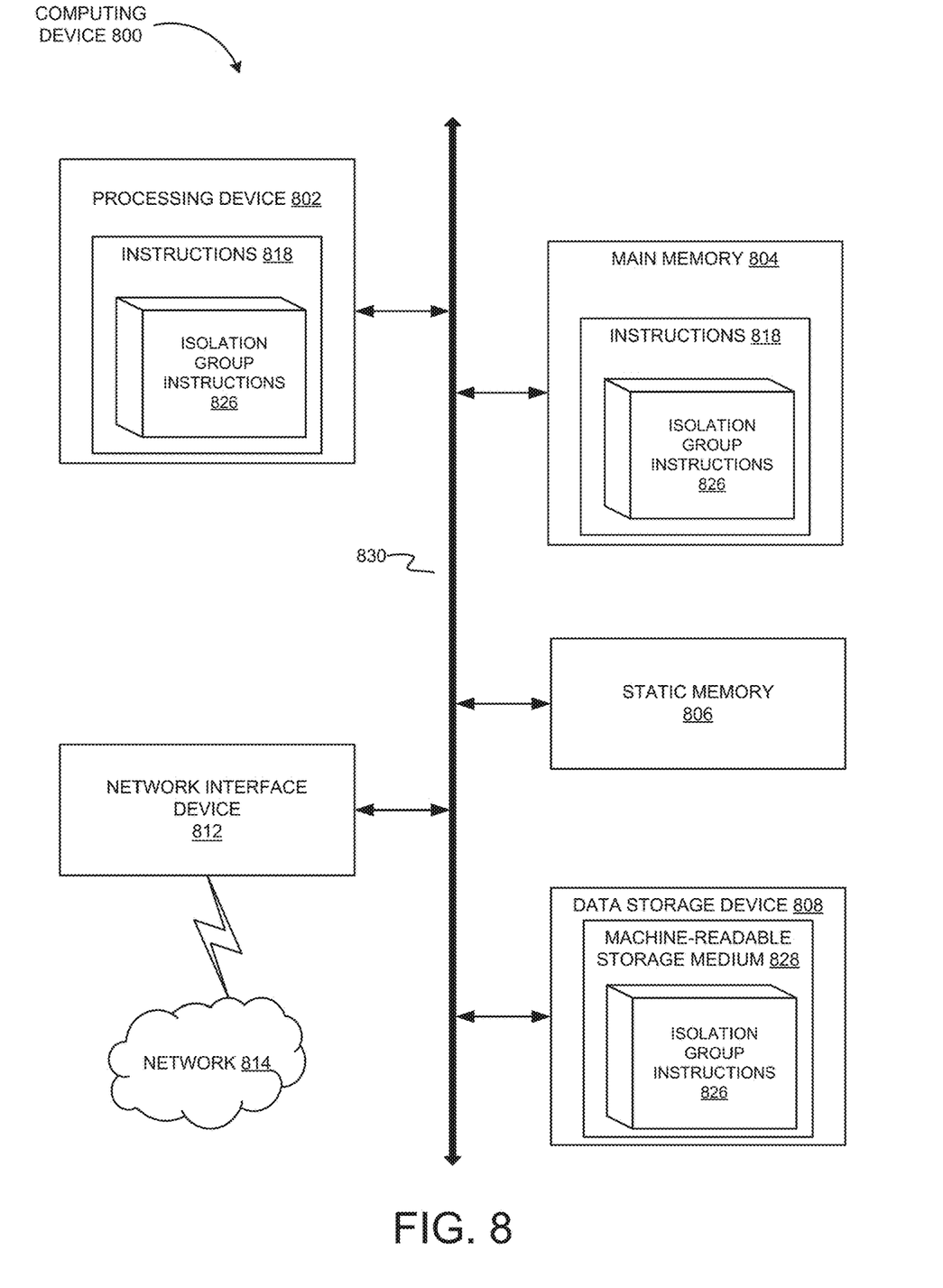
FIG. 8 is a block diagram of an example computing device.

FIG. 8 is a block diagram of an example computing device 800 that may perform one or more of the operations described herein, in accordance with the present embodiments. The computing device 800 may be connected to other computing devices in a LAN, an intranet, an extranet, and/or the Internet. The computing device 800 may operate in the capacity of a server machine in client-server network environment or in the capacity of a client in a peer-to-peer network environment. The computing device 800 may be provided by a personal computer (PC), a set-top box (STB), a server, a network router, switch or bridge, or any machine capable of executing a set of instructions (sequential or otherwise) that specify actions to be taken by that machine. Further, while only a single computing device 800 is illustrated, the term "computing device" shall also be taken to include any collection of computing devices that individually or jointly execute a set (or multiple sets) of instructions to perform the methods discussed herein.

The example computing device 800 may include a processing device (e.g., a general purpose processor, ASIC, etc.) 802, a main memory 804, a static memory 806 (e.g., flash memory and/or a data storage device 808), which may communicate with each other via a bus 830. The processing device 802 may be provided by one or more general-purpose processing devices such as a microprocessor, central processing unit, or the like. In an illustrative example, processing device 802 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also comprise one or more special-purpose processing devices such as an application specific integrated circuit (ASIC), a field programmable gate array (FPGA), a digital signal processor (DSP), network processor, or the like. The processing device 802 may be configured to execute the operations described herein, in accordance with one or more aspects of the present disclosure, for performing the operations and steps discussed herein.

The computing device 800 may further include a network interface device 812, which may communicate with a network 814. The data storage device 808 may include a machine-readable storage medium 828 on which may be stored one or more sets of instructions, e.g., instructions for carrying out the operations described herein, in accordance with one or more aspects of the present disclosure. Instructions 818 implementing isolation group instructions 826 may also reside, completely or at least partially, within main memory 804 and/or within processing device 802 during execution thereof by the computing device 800, main memory 804 and processing device 802 also constituting computer-readable media. The instructions may further be transmitted or received over the network 814 via the network interface device 812.

While machine-readable storage medium 828 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer processing device, a computer, a system on a chip, or multiple ones, or combinations, of the foregoing. A computer processing device may include one or more processors which can include special purpose logic circuitry, e.g., an FPGA (field programmable gate array) or an ASIC (application specific integrated circuit), a central processing unit (CPU), a multi-core processor, etc. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative, procedural, or functional languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto optical disks, optical disks, or solid state drives. However, a computer need not have such devices. Moreover, a computer can be embedded in another device, e.g., a smart phone, a mobile audio or media player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse, a trackball, a touchpad, or a stylus, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method, comprising:
    identifying a first group of users of an online system, wherein the online system allows users to interact with one another;
    grouping the first group of users into a first isolation group;
    identifying a second group of users of the online system, wherein the second group of users is separate from the first group of users; and
    by a computer processing device, grouping the second group of users into a second isolation group, wherein:
        the first isolation group and the second isolation group comprise logical boundaries that restrict interaction within the online system between users in the first isolation group and users in the second isolation group; and
        the first isolation group and the second isolation group are hosted on the same server.

2. The method of claim 1, further comprising:
    introducing an application feature to the users in the first isolation group;
    tracking one or more performance metrics associated with the application feature;
    determining, in view of the one or more performance metrics, that the application feature is successful; and
    introducing the application feature to the users in the second isolation group.

3. The method of claim 1, further comprising grouping one or more additional groups of users into one or more respective isolation groups, wherein:
    each isolation group comprises logical boundaries that restrict interaction between users in separate isolation groups; and
    all of the isolation groups are hosted on the same server.

4. The method of claim 1, further comprising merging the second isolation group with another isolation group to create a third isolation group, wherein:
    the merging is accomplished via a logical removal of the logical boundaries; and
    all of the isolation groups are hosted on the same server.

5. The method of claim 1, further comprising:
    removing the logical boundaries between the first isolation group and the second isolation group for a predetermined period of time, wherein during the predetermined period of time, the users in the first isolation group are permitted to interact with users in the second isolation group; and
    after the predetermined period of time has ended, restoring the logical boundaries between the first isolation group and the second isolation group such that interaction between users in different isolation groups is restricted.

6. The method of claim 1, further comprising removing the logical boundaries with respect to a first user in the first isolation group, wherein when the logical boundaries are removed, the first user may interact with users in the first isolation group and with users in the second isolation group.

7. The method of claim 1, wherein:
each user in the first isolation group installed a mobile application associated with the online system on a respective client device during a first time window; and
each user in the second isolation group installed the mobile application on a respective client device during a second time window.

8. The method of claim 1, wherein each user is grouped into a respective isolation group in view of a spending profile of the user.

9. The method of claim 1, wherein the online system is an online gaming system.

10. The method of claim 1, further comprising:
receiving, during a first window of time, a first plurality of indications that each user in the first group of users installed an application from the online system on a respective mobile device; and
receiving, during a second window of time, a second plurality of indications that each user in the second group of users installed the application from the online system on a respective mobile device, wherein:
the first group of users is grouped into the first isolation group as a result of the first plurality of indications being received during the first time window, and
the second group of users is grouped into the second isolation group as a result of the second plurality of indications being received during the second time window.

11. A system, comprising:
a computer processing device programmed to:
identify a first group of users of an online system, wherein the online system allows users to interact with one another;
group the first group of users into a first isolation group;
identify a second group of users of the online system, wherein the second group of users is separate from the first group of users; and
group the second group of users into a second isolation group, wherein:
the first isolation group and the second isolation group comprise logical boundaries that restrict interaction within the online system between users in the first isolation group and users in the second isolation group; and
the first isolation group and the second isolation group are hosted on the same server.

12. The system of claim 11, wherein the computer processing device is further programmed to group one or more additional groups of users into one or more respective isolation groups, wherein:
each isolation group comprises logical boundaries that restrict interaction between users in separate isolation groups; and
all of the isolation groups are hosted on the same server.

13. The system of claim 11, wherein the computer processing device is further programmed to merge the second isolation group with another isolation group to create a third isolation group, wherein:

the merging is accomplished via a logical removal of the logical boundaries; and
all of the isolation groups are hosted on the same server.

14. The system of claim 11, wherein the computer processing device is further programmed to:
remove the logical boundaries between the first isolation group and the second isolation group for a predetermined period of time, wherein during the predetermined period of time, the users in the first isolation group are permitted to interact with users in the second isolation group; and
at the end of the predetermined period of time, restore the logical boundaries between the first isolation group and the second isolation group such that interaction between users in different isolation groups is restricted.

15. The system of claim 11, wherein the computer processing device is further programmed to remove the logical boundaries with respect to a first user in the first isolation group, wherein when the logical boundaries are removed, the first user may interact with users in the first isolation group and with users in the second isolation group.

16. The system of claim 11, wherein the computer processing device is further programmed to:
introduce an application feature to the users in the first isolation group;
track one or more performance metrics associated with the application feature;
determine, in view of the one or more performance metrics, that the application feature is successful; and
introduce the application feature to the users in the second isolation group.

17. A non-transitory computer-readable medium having instructions stored thereon that, when executed by a computer processing device, cause computer processing device to:
identify a first group of users of an online system, wherein the online system allows users to interact with one another;
group the first group of users into a first isolation group;
identify a second group of users of the online system, wherein the second group of users is separate from the first group of users; and
by the computer processing device, group the second group of users into a second isolation group, wherein:
the first isolation group and the second isolation group comprise logical boundaries that restrict interaction within the online system between users in the first isolation group and users in the second isolation group; and
the first isolation group and the second isolation group are hosted on the same server.

18. The non-transitory computer-readable storage medium of claim 17, wherein the instructions further cause the one or more computer processing devices to:
introduce an application feature to the users in the first isolation group;
track one or more performance metrics associated with the application feature;
determine, in view of the one or more performance metrics, that the application feature is successful; and
introduce the application feature to the users in the second isolation group.

19. The non-transitory computer: readable storage medium of claim 17, wherein the instructions further cause the one or more computer processing devices to group one or more additional groups of users into one or more respective isolation groups, wherein:

each isolation group comprises logical boundaries that restrict interaction between users in separate isolation groups; and all of the isolation groups are hosted on the same server.

20. The non-transitory computer-readable storage medium of claim 17, wherein the instructions further cause the one or more computer processing devices to merge the second isolation group with another isolation group to create a third isolation group, wherein:

the merging is accomplished via a logical removal of the logical boundaries; and all of the isolation groups are hosted on the same server.

* * * * *